March 17, 1931.  L. J. COONEY  1,796,646
SIGNALING AND CONTROL DEVICE FOR AIR BRAKES
Filed March 18, 1930
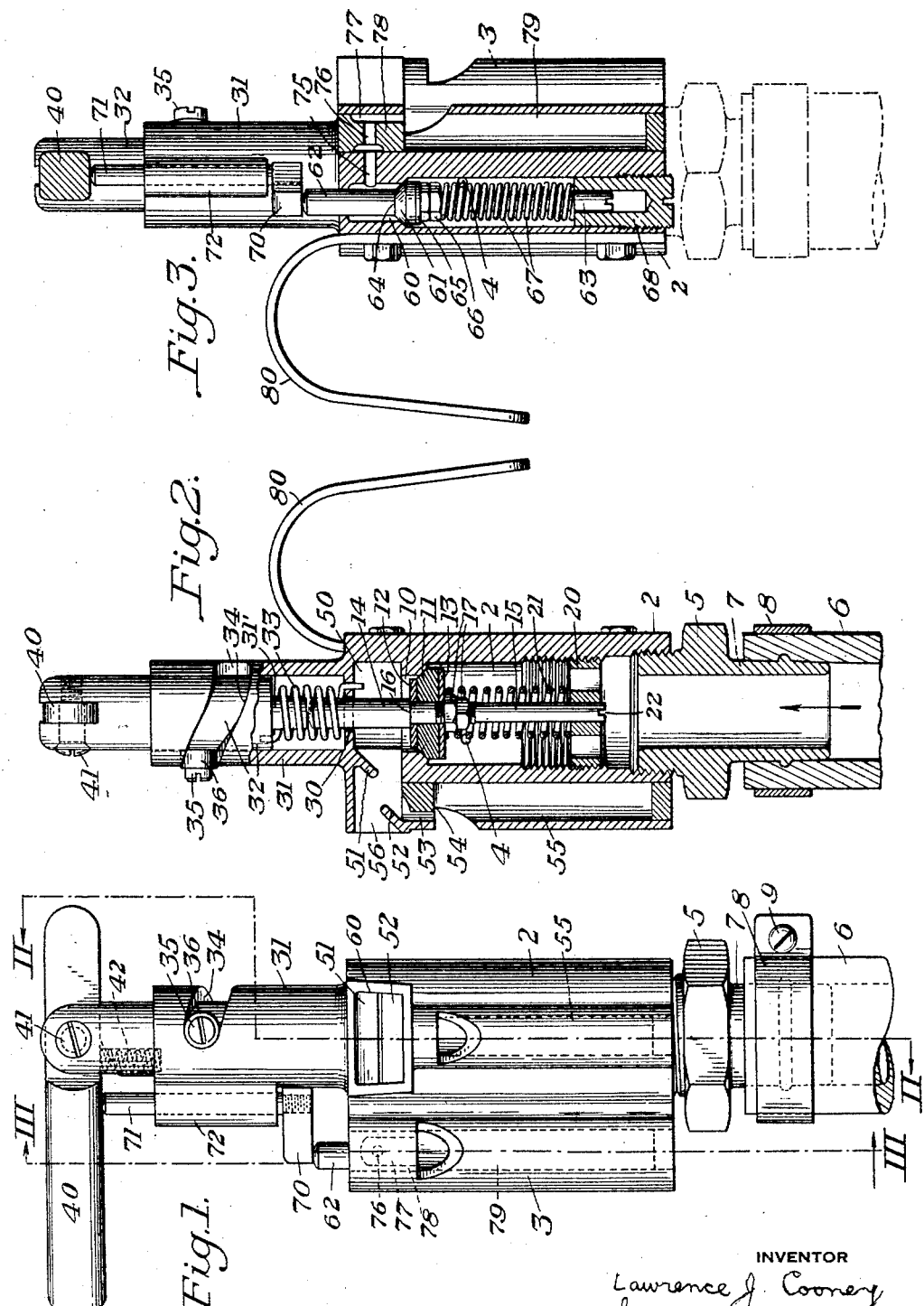

Patented Mar. 17, 1931

1,796,646

UNITED STATES PATENT OFFICE

LAWRENCE J. COONEY, OF PITTSBURGH, PENNSYLVANIA, ASSIGNOR TO KEYSTONE GRINDER & MANUFACTURING COMPANY, OF PITTSBURGH, PENNSYLVANIA, A CORPORATION OF PENNSYLVANIA

SIGNALING AND CONTROL DEVICE FOR AIR BRAKES

Application filed March 18, 1930. Serial No. 436,731.

This invention relates generally to signaling and control devices for air brakes, and more particularly to such devices for use in connection with the air brake systems of trains.

When a train is backing into a station, the brakeman ordinarily stands on the rear car of the train and operates a signaling device to warn people of the approach of the train. This signaling device ordinarily takes the form of a whistle which is connected to an air hose. The whistle is operated as occasion demands to keep the tracks clear and if, for any reason it is necessary to stop the train in order to avoid accident, the brakeman is able to control the brakes by releasing the air in the control device so that the pressure therein is reduced and the brakes are applied.

My invention relates to a control and signaling device of the type referred to in which a single handle is provided both for operating the warning signal which is usually a whistle and for applying the brakes if the occasion arises. The warning whistle is sounded by depressing the handle, and the application of the brakes is accomplished by rotating the handle. The device is provided with two alarms which ordinarily are whistles, one of which is sounded when it is simply desired to give a warning and the other of which is sounded simultaneously with the application of the brakes.

In the accompanying drawing which illustrates the present preferred embodiment of my invention, Figure 1 is a front elevation for the signaling and control device;

Figure 2 is a section on the line II—II of Figure 1; and

Figure 3 is a section on the line III—III of Figure 1.

Referring more particularly to the accompanying drawing, the device comprises a relatively large air chamber 2 and a relatively small air chamber 3 which are in communication with each other through an opening 4. The lower end of the chamber 2 is provided with a coupling 5 which is threaded into the walls of the chamber. An air hose 6 is connected to the lower end 7 of the coupling by means of a clamp 8 secured by a screw 9. The air hose 6 is connected to the train brakes in such manner that when the air in the chamber 2 is released and the pressure reduced the brakes are applied. When the air in the chamber 2 is maintained under compression, the brakes are maintained in their inoperative position. This arrangement of air brakes is well known and, accordingly, has not been shown in the drawing.

The chamber 2 has an air outlet 10 controlled by a non-metallic plug valve 11. The non-metallic valve is confined between an upper washer 12 and a lower washer 13 on the valve stem. The upper portion 14 of the valve stem is of larger diameter than the lower portion 15 so as to provide a shoulder 16 for retaining the washer 12. The lower washer 13 is retained in position on the lower portion 15 of the stem by means of nuts 17. This arrangement provides a non-metallic valve retained securely in position by metallic washers.

The lower portion 15 of the stem is slidable in a spider 20 which is screwed into the wall of the chamber 2. A spring 21 surrounds the stem portion 15 and abuts against the spider and the washer 13, thereby normally maintaining the valve in closed position. The lower end of the stem portion 15 is provided with a slot 22 so that the valve may be rotated by a screw driver in order to seat the valve properly. The compression of the spring 21 may be regulated by screwing the spider 20 into or out of the wall of the chamber 2.

The upper portion 14 of the stem extends through an opening 30 into a housing 31 and abuts the lower end of a rod 31' on a plunger 32 which is slidable and rotatable within the housing above the portion 14. A spring 33 surrounds the upper stem portion 14 and rod 31' normally maintaining the plunger 32 in the position indicated in the drawing.

The housing 31 has a sloping slot or groove 34 which receives a pin 35 and roller 36 connected to the plunger 32 by the screw The upper end of the plunger 32 has a handle 40 pivoted thereto by a screw 41. A spring 42 has its ends abutting the housing 31 and the lower edge of the handle 40 so as to normally maintain the handle in the position indicated in Figure 1.

When the handle 40 is rotated in a substantially horizontal plane, the plunger 32 is rotated and it also is lowered into the housing 31 because of the screw 35 and roller 36 projecting into the sloping groove 34. This moves the upper stem portion 14 downwardly and opens the valve 11 so that air entering from the air hose 6 flows through the chamber 2 and opening 10 into a chamber 50 located between the chamber 2 and the housing 31. The air flows through the chamber 50 to the left, as viewed in Figure 2, and is deflected by baffles 51 and 52 through an opening 53 of a whistle 54. The whistle 54 has a sound box 55 to increase its volume. The air which is not deflected through the opening 53 in the whistle by the baffles 51 and 52 escapes through an opening 56 to the atmosphere.

From the above description, it will be seen that when the handle 40 is rotated in a substantially horizontal plane, the valve 11 is opened and the compressed air within the chamber 2 is allowed to escape into the atmosphere through the opening 56, thereby applying the brakes. At the same time that the brakes are applied, a portion of the air in chamber 50 is deflected by the baffles 51 and 52 in order to blow the whistle 54.

The chamber 2 is in constant communication with the chamber 3 through the air passage 4. The chamber 3 has an outlet 60 controlled by a non-metallic plug valve 61. The valve stem has an upper portion 62 and a lower portion 63, the portion 62 being of greater diameter than the portion 63 in order to form a seat 64 for the upper end of the valve. The valve is secured by a washer 65 and nuts 66. The valve is normally retained in the position indicated in Figure 3 by a spring 67 which surrounds the lower stem portion 63 and abuts against the nut 66 and a plug 68 which is screwed into the wall of the chamber 3.

The upper stem portion 62 contacts with an arm 70 carried by a rod 71 slidable in a guide 72 on the housing 31. When the handle 40 is moved downwardly in a vertical direction, it lowers the valve 61 and allows the air to flow from the chamber 3 through the outlet 60 and through a passage 75 and a passage 76 into a passage 77 in a whistle 78. The whistle 78 is provided with a sound box 79 for increasing the volume of sound. The device has a handle 80 by which it may be fastened to a portion of the rear car of the train.

When a train is backing into a station and it becomes necessary to blow the whistle, the handle 40 is depressed thereby opening the valve 61 and blowing the whistle 78. This whistle ordinarily is blown several times while the train is approaching the station. If it becomes necessary to apply the brakes, the handle 40 is simply rotated without changing the position of the hand on the handle, and this rotation depresses the plunger 32 and opens the valve 11, which controls the flow of air from the chamber 2. When the valve 11 is opened, the air pressure in the chamber 2 is reduced and the brakes are applied. At the same time that the brakes are applied, the air flowing from the chamber 2 causes the whistle 54 to be blown so that, in addition to applying the brakes, anyone in the path of the train is warned of the approach of the train.

I have illustrated and described the present preferred form of my invention. It is to be understood, however, that the invention may be otherwise embodied within the scope of the following claims.

I claim:

1. A signaling and control device for air brakes, which comprises a chamber connected to a source of compressed air and having an outlet, a valve controlling the outlet, a second chamber communicating with the first chamber and having an outlet, a second valve controlling the outlet of the second chamber, an alarm communicating with the second chamber, and common means for sounding the alarm and opening said first-mentioned valve whereby the air pressure in the first chamber is reduced to apply a brake.

2. A signaling and control device for air brakes, which comprises a chamber connected to a source of compressed air and having an outlet, a plug valve controlling the outlet, a second chamber communicating with the first chamber and having an outlet, a second plug valve controlling the outlet of the second chamber, an alarm communicating with the second chamber, and common means for sounding the alarm and opening said first-mentioned valve whereby the air pressure in the first chamber is reduced to apply a brake.

3. A signaling and control device for air brakes, comprising a chamber connected to a source of compressed air and having an outlet, an alarm, the outlet communicating with the alarm, a valve in the outlet, a second chamber communicating with the first chamber and having an outlet, a second valve in said outlet, a second alarm communicating with the outlet of the second chamber, and common means for actuating the first and second valves.

4. A signaling and control device for air brakes, which comprises a chamber connected to a source of compressed air and having an outlet, a valve controlling the outlet, a second chamber communicating with the first chamber and having an outlet, a second valve controlling the outlet of the second chamber, an alarm communicating with the second chamber, and a handle, both of said valves being operable by said handle.

5. A signaling and control device for air brakes, which comprises a chamber connected to a source of compressed air and having an outlet, a valve controlling the outlet, a second chamber communicating with the first chamber and having an outlet, a second valve controlling the outlet of the second chamber, an alarm communicating with the second chamber, and a handle, one of said valves being operable by depressing the handle, the other valve being operable by rotating the handle.

6. A signaling and control device for air brakes, which comprises a chamber connected to a source of compressed air and having an outlet, a valve controlling the outlet, a second chamber communicating with the first chamber and having an outlet, a second valve controlling the outlet of the second chamber, an alarm communicating with the second chamber, a handle, means for opening one of said valves by depressing the handle, the other valve having a stem extending within a housing, a plunger within the housing above the stem, the plunger being connected to the handle, and means for depressing the plunger to open said other valve upon rotation of the handle.

7. A signaling and control device for air brakes, which comprises a chamber connected to a source of compressed air and having an outlet, a valve controlling the outlet, a second chamber communicating with the first chamber and having an outlet, a second valve controlling the outlet of the second chamber, an alarm communicating with the second chamber, a handle, means for opening one of said valves by depressing the handle, the other valve having a stem extending within a housing, a plunger within the housing above the stem, the plunger being connected to the handle, and a projection and sloping groove connection between the plunger and housing whereby rotation of the handle depresses the stem and opens said other valve.

8. A signaling and control device for air brakes, which comprises a chamber connected to a source of compressed air and having an outlet, a valve controlling the outlet, a second chamber communicating with the first chamber and having an outlet, a second valve controlling the outlet of the second chamber, an alarm communicating with the second chamber, a handle, means for opening one of said valves by depressing the handle, the other valve having a stem extending within a housing, a plunger within the housing above the stem, the plunger being connected to the handle, and a projection on the plunger extending into a sloping recess in the housing whereby rotation of the handle depresses the stem and opens said other valve.

9. In a signaling and control device for air brakes, a chamber connected to a source of compressed air and having an outlet, a non-metallic valve controlling the outlet, the valve having a stem extending therethrough, means for depressing the valve, the lower end of the stem being slidable in a spider screwed in the chamber, and a spring surrounding the stem between the spider and valve, the lower end of the stem having a groove to aid in seating the valve.

10. A signaling and control device for air brakes, which comprises a chamber connected to a source of compressed air and having an outlet, a valve controlling the outlet, a second chamber communicating with the first chamber and having an outlet, a second valve controlling the outlet of the second chamber, an alarm communicating with the second chamber, an alarm communicating with the first chamber, one of the valves having a stem projecting upwardly within a housing, a plunger slidable and rotatable in the housing above the stem, a projecting and sloping groove connection between the plunger and housing, a handle pivoted to the plunger, and means for opening the other valve upon depressing the handle.

11. A signaling and control device for air brakes, which comprises a chamber connected to a source of compressed air and having an outlet, a valve controlling the outlet, a second chamber communicating with the first chamber and having an outlet, the two chambers being immovable relative to each other, a second valve controlling the outlet of the second chamber, an alarm communicating with the second chamber, and means actuated from a common element for operating both said valves.

In testimony whereof I have hereunto set my hand.

LAWRENCE J. COONEY.